United States Patent
Ushida et al.

(10) Patent No.: US 8,913,860 B2
(45) Date of Patent: Dec. 16, 2014

(54) OPTICAL WAVEGUIDE STRUCTURE AND OPTICAL WAVEGUIDE DEVICE

(75) Inventors: Jun Ushida, Tokyo (JP); Shigeru Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/823,027

(22) PCT Filed: Sep. 21, 2011

(86) PCT No.: PCT/JP2011/005319
§ 371 (c)(1),
(2), (4) Date: Mar. 13, 2013

(87) PCT Pub. No.: WO2012/042795
PCT Pub. Date: Apr. 5, 2012

(65) Prior Publication Data
US 2013/0170793 A1   Jul. 4, 2013

(30) Foreign Application Priority Data

Sep. 28, 2010 (JP) ................................. 2010-217468

(51) Int. Cl.
  *G02B 6/26* (2006.01)
  *G02B 6/10* (2006.01)
  *G02B 6/30* (2006.01)
  *G02B 6/122* (2006.01)
(52) U.S. Cl.
  CPC  *G02B 6/26* (2013.01); *G02B 6/305* (2013.01); *G02B 6/1228* (2013.01)
  USPC ............................................ 385/43; 385/131
(58) Field of Classification Search
  USPC ........................................................ 385/43
  See application file for complete search history.

(56) References Cited

U.S. PATENT DOCUMENTS

| 6,108,478 A | 8/2000 | Harpin et al. |
| 7,088,890 B2 * | 8/2006 | Liu .................................. 385/43 |
| 7,532,784 B2 * | 5/2009 | Tolshikhin et al. ............. 385/14 |
| 2004/0017976 A1 | 1/2004 | Luo et al. |

FOREIGN PATENT DOCUMENTS

| JP | 2001-33642 A | 2/2001 |
| JP | 2006-517673 A | 7/2006 |
| JP | 2010-54929 A | 3/2010 |
| WO | WO 03/050580 A1 | 6/2003 |

* cited by examiner

*Primary Examiner* — Omar R Rojas
(74) *Attorney, Agent, or Firm* — Foley & Lardner LLP

(57) ABSTRACT

The present invention provides a small optical waveguide structure capable of converting the spot size of light, and capable of reducing the conversion loss when compared under the condition of the same waveguide length and performing an optical conversion with high efficiency. An optical waveguide structure (100) includes a base waveguide (110) including a taper section (111) whose width becomes continuously narrower from one side toward another side, and a narrow-width section (112) that is consecutively connected to a narrow-width side of the taper section (111) and extends toward the another side. In the optical waveguide structure (100), at least three-layered upper waveguides (121 to 123) each of which has a planar shape smaller than the taper section (111) and includes a planar-view-roughly-wedge-shaped section whose width becomes continuously narrower from the one side toward the another side at least on a tip side are stacked above the taper section (111) of the base waveguide (110) in such a manner that the planar shape becomes successively smaller from the base waveguide side (110).

9 Claims, 13 Drawing Sheets

OPTICAL WAVEGUIDE STRUCTURE AND OPTICAL WAVEGUIDE DEVICE

This application is the National Phase of PCT/JP2011/005319, filed Sep. 21, 2011, which claims priority to Japanese Application No. 2010-217468, filed Sep. 28, 2010, and PCT application No. PCT/JP2011/003504, filed on Jun. 20, 2011, the disclosures of which are incorporated herein in their entireties by reference.

TECHNICAL FIELD

The present invention relates to an optical waveguide structure and an optical waveguide device.

BACKGROUND ART

Information communication networks typified by the Internet are spread all over the world as the infrastructure indispensable to people's lives. As a technique that supports the traffic of this Internet, there is an optical communication technology using optical fibers. Optical communication devices using a silicon platform capable of using 1.3 μm band and 1.5 μm band among the optical fiber communication wavelength bands have been expected as communication devices capable of realizing high-density optical integrated circuits that can be manufactured at a low price by using the CMOS manufacturing technique.

However, it is believed that it is difficult to couple light propagating through an optical fiber or thorough space with an optical waveguide device using a silicon platform. This is because since the refractivity difference between the core and the clad of a waveguide within an ordinary optical waveguide device is conventionally large, its size is in the order of 1 μm square. Therefore, it is significantly smaller than the spot size of light emitted from an ordinary single-mode optical fiber, which is about 9 μm. Accordingly, it is extremely important in silicon photonics to realize a mode converter having a sufficiently small device size, capable of optically coupling an optical waveguide device with a single-mode optical fiber.

Mode converters that have been proposed in the past can be generally divided into two types, i.e., devices (1) having a taper structure for adiabatically changing the mode cross-sectional area of light and devices (2) having an inverse taper structure for adiabatically changing the mode cross-sectional area of light and having a clad for confining the light attached over this inverse taper structure.

In the case of the latter devices (2), it is necessary to increase the taper length of the inverse taper section and the length of the upper clad section to several hundred μm or longer, and thus it is very difficult to reduce the devices in size.

As for the former devices (1), a structure in which a horizontal taper section and a vertical taper section, which are in such a relation that their central axis directions are perpendicular to each other, are three-dimensionally combined has been proposed. However, its manufacturing process is complicated, and thus making the manufacturing very difficult.

As for the former devices (1), a structure in which a plurality of waveguides having taper sections having different planar shapes are placed on top of one another into a layer structure and the manufacturing process is thereby simplified has been proposed (Patent literatures 1 to 5).

Patent literature 1 discloses in FIG. 4 an optical waveguide structure having a two-layer structure composed of: a first layer (102) having a wide-width section having a relatively wide and uniform width and a narrow-width section having a relatively narrow and uniform width, and having such a shape that these sections are connected with a taper section interposed therebetween; and a second layer (103) formed above the wide-width section of the first layer (102) with a shape smaller than that wide-width section, composed of a wide-width section having the same width as the wide-width section of the first layer (102), and a wedge-shaped section connected to the wide-width section.

Patent literature 2 discloses in FIGS. 1 and 6 an optical waveguide structure having a two-layer structure composed of: a first layer (20, 40) having a wide-width section (21) having a relatively wide width and a narrow-width section (40) having a relatively narrow width, and having such a shape that these sections are connected with a taper section (22) interposed therebetween; and a second layer (30) formed above the wide-width section and the taper section of the first layer (20, 40) with a shape smaller than these sections, composed of a first taper section (31) whose width becomes continuously narrower from one end toward the other end, a connection section (32) which is consecutively connected to the other end of the first taper section (31) and has a uniform width, and a second taper section (33) which is consecutively connected to the connection section (32) and whose width becomes continuously narrower from one end located on the connection section (32) side toward the other end.

Patent literature 3 discloses in FIG. 1 an optical waveguide structure having a two-layer structure composed of: a first layer (4) composed of a taper section whose width becomes continuously narrower from one end toward the other end, and a narrow-width section which is consecutively connected to the other end of the taper section and has a uniform width; and a second layer (5) composed of a wedge-shaped section formed above the taper section of the first layer (4) with a shape smaller than that taper section.

Patent literature 4 discloses in FIG. 1(b) an optical waveguide structure having a two-layer structure composed of: a first layer composed of a wide-width section (lower section of 101) having a uniform width, and a taper section (106) which is consecutively connected to the wide-width section and whose width becomes continuously narrower from one end toward the other end; and a second layer composed of a wide-width section (upper section of 101) formed above the wide-width section of the first layer with the same shape of that wide-width section, and a wedge-shaped section (105) which is consecutively connected to the wide-width section. In Patent literature 4, the wide-width section of the first layer and the wide-width section of the second layer are integrally formed.

Patent literature 5 discloses in FIG. 1 an optical waveguide structure having a two-layer structure composed of: a first layer composed of a taper section (110) whose width becomes continuously narrower from one end toward the other end, and a narrow-width section (116) which is consecutively connected to the other end of the taper section (110) and has a uniform width; and a second layer composed of a wedge-shaped section (112) formed above the taper section (110) of the first layer with a shape smaller than that taper section.

Patent literature 5 discloses in FIG. 3 an optical waveguide structure having a three-layer structure composed of: a first layer composed of a taper section (310) whose width becomes continuously narrower from one end toward the other end, and a narrow-width section (316) which is consecutively connected to the other end of the taper section (310) and has a uniform width; a second layer composed of a wedge-shaped section (312) formed above the taper section (310) of the first layer with a shape smaller than that taper section; and a third layer composed of a wedge-shaped section (313) formed above the second layer with a shape smaller than that second layer.

CITATION LIST

Patent Literature

Patent literature 1: Japanese Unexamined Patent Application Publication No. 2001-033642
Patent literature 2: Japanese Unexamined Patent Application Publication No. 2010-54929
Patent literature 3: U.S. Pat. No. 6,108,478
Patent literature 4: International Patent Publication No. WO2003/050580
Patent literature 5: U.S. Pat. No. 7,088,890

SUMMARY OF INVENTION

Technical Problem

In the optical waveguide structures disclosed in Patent literatures 1 to 4 and FIG. 1 of Patent literature 5, the spot size of light is converted when the light moves from the second layer to the first layer, or from the first layer to the second layer. However, since the optical waveguides of these optical waveguide structures have a two-layer structure, the spot-size conversion, which occurs when the light move from one layer to the other, occurs only once. Therefore, the loss in the mode conversion is large. Further, it is difficult to achieve desirable conversion efficiency by using a small device.

Note that in the optical waveguide structure disclosed in Patent literature 2, it is stated that two taper sections (31 and 32) having different taper angles are disposed in the second layer (30) and the taper angles are set to a larger angle on the side of one end and a smaller angle on the side of the other end, so that it is possible to perform high-efficiency mode conversion with a high compression ratio and reduce the total length (paragraph [0008]). However, there is no specific description about the coupling with a single-mode fiber in Patent literature 2, and therefore it is unclear with how much total length the mode conversion can be performed. Even if a better shape of the second layer (30) is worked out, it is believed that there is a limit to the reduction in size and the efficiency improvement in the optical waveguide structure having a two-layer structure disclosed in Patent literature 2.

In the optical waveguide structure disclosed in FIG. 3 of Patent literature 5, since the optical waveguide has a three-layer structure, the spot-size conversion, which occurs when the light move from one layer to another, occurs twice. Therefore, the conversion loss is reduced compared to the above-described optical waveguide structures when they are compared under the condition of the same waveguide length, and thus making it possible to increase the efficiency. However, it is believed that as the optical communication technology develops, it will be desired in the future to develop a smaller optical waveguide structure capable of reducing the conversion loss even further when compared under the condition of the same waveguide length and performing an optical conversion with higher efficiency.

Solution to Problem

An object of the present invention is to provide a small optical waveguide structure capable of converting the spot size of light, and capable of reducing the conversion loss when compared under the condition of the same waveguide length and performing an optical conversion with high efficiency.

An optical waveguide structure according to the present invention includes a base waveguide including a taper section whose width becomes continuously narrower from one side toward another side, and a narrow-width section that is consecutively connected to a narrow-width side of the taper section and extends toward the another side, in which at least three-layered upper waveguides each of which has a planar shape smaller than the taper section and includes a planar-view-roughly-wedge-shaped section whose width becomes continuously narrower from the one side toward the another side at least on a tip side are stacked above the taper section of the base waveguide in such a manner that the planar shape becomes successively smaller from the base waveguide side.

In this specification, "planar shape" means a surface shape parallel to the substrate surface of a substrate on which an optical waveguide structure is formed, unless otherwise specified.

In this specification, "roughly-wedge-shape" includes a perfect wedge shape having a pointed tip and a shape similar to that shape such as a wedge shape having a rounded tip. It also includes variations of the shape clue to the manufacturing process accuracy.

Advantageous Effects of Invention

According to the present invention, it is possible to provide a small optical waveguide structure capable of converting the spot size of light, and capable of reducing the conversion loss when compared under the condition of the same waveguide length and performing an optical conversion with high efficiency.

DESCRIPTION OF EMBODIMENTS

First Exemplary Embodiment

An optical waveguide structure and a configuration of an optical waveguide device including this optical waveguide structure according to an exemplary embodiment in accordance with the present invention are explained with reference to the drawings.

Figure 1A:
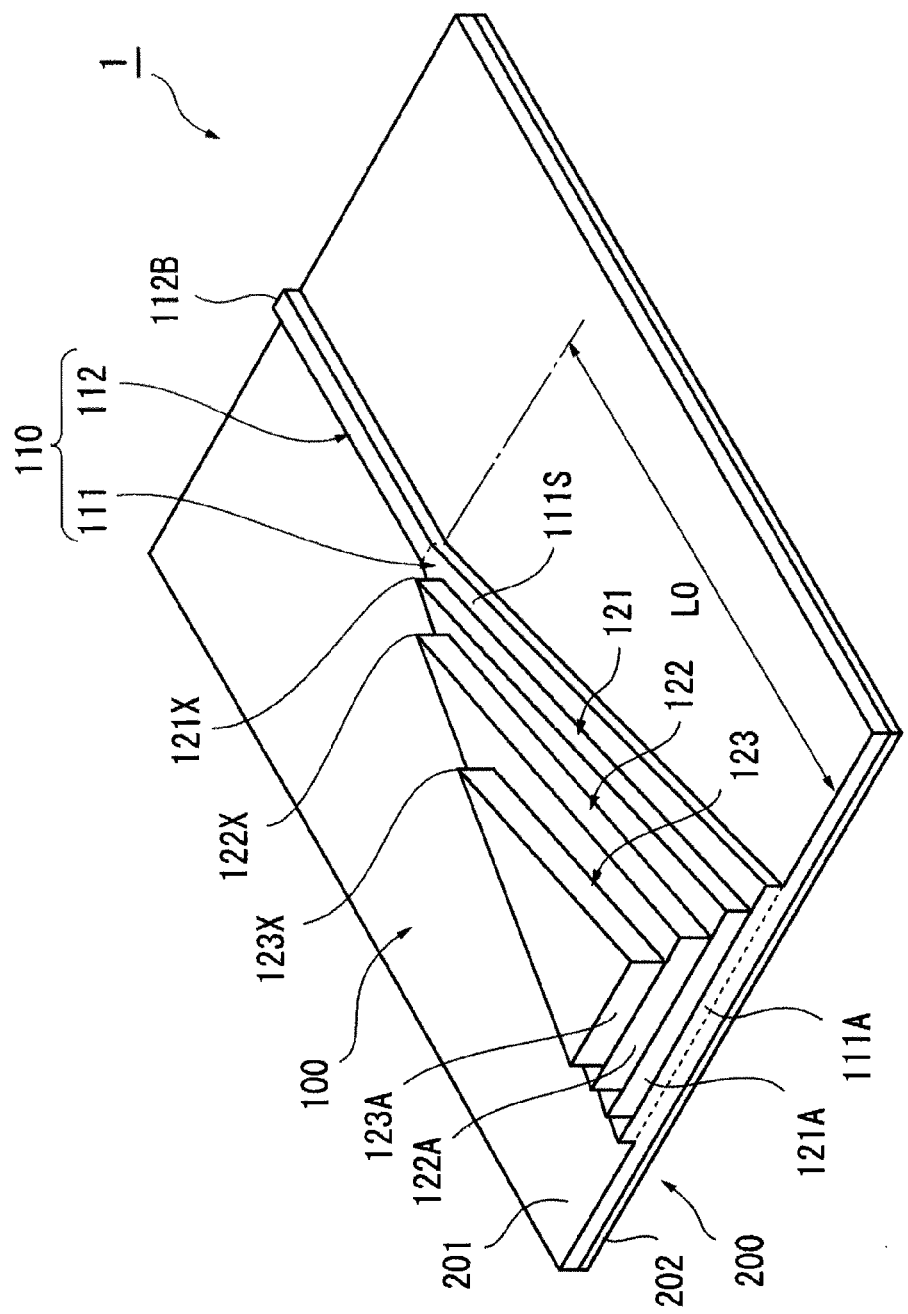
FIG. 1A is a perspective view of the main part of an optical waveguide device according to an exemplary embodiment of the present invention.
Figure 1B:
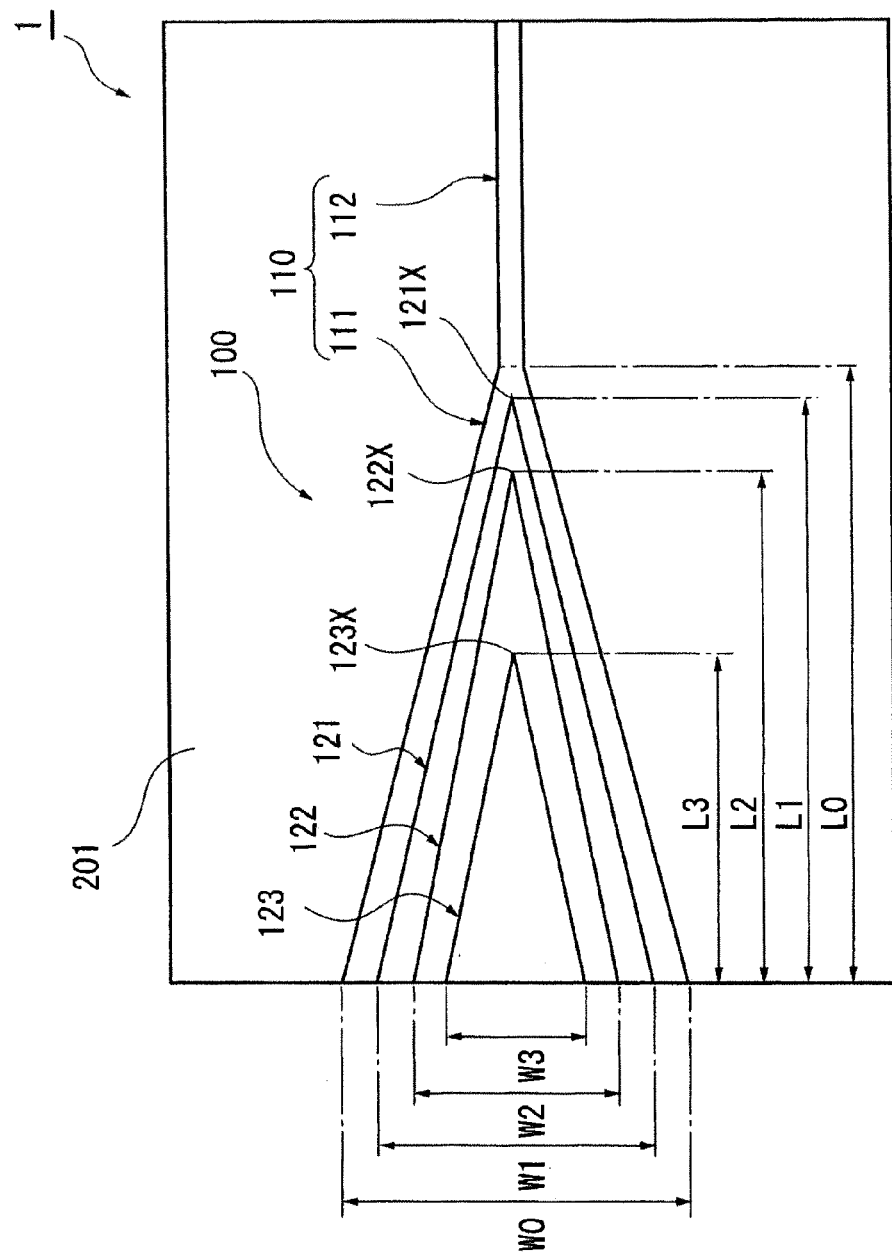
FIG. 1B is a top view of the main part of an optical waveguide device according to an exemplary embodiment of the present invention.
Figure 1C:
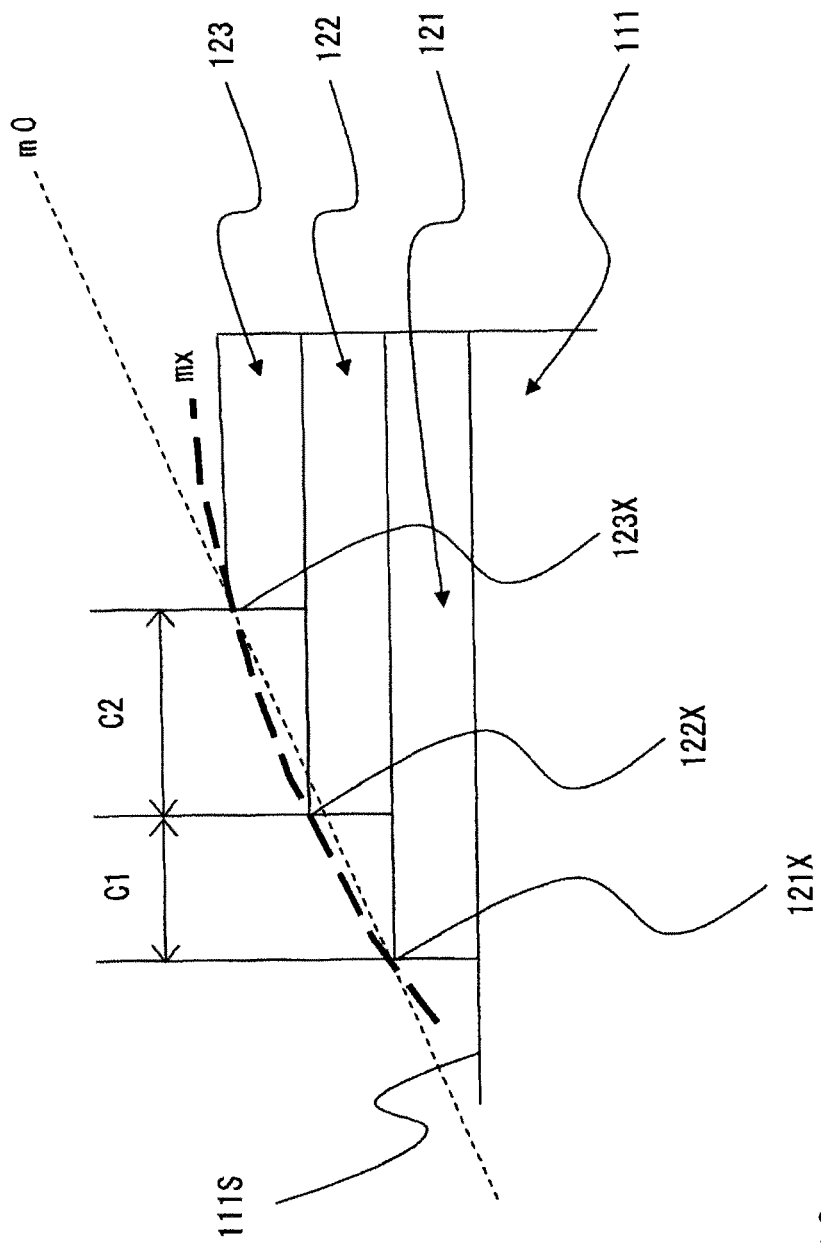
FIG. 1C is a side view of the main part of an optical waveguide device according to an exemplary embodiment of the present invention.

FIG. 1A is a perspective view of the main part of an optical waveguide device according to this exemplary embodiment. Further, FIG. 1B is a top view of the main part and FIG. 1C is a side view of the main part. To make the drawings to be viewed more easily, the scale and the position of each component are changed as appropriate from the actual scale and position and the illustration of some components is omitted in the drawings. Hatching is also omitted as appropriate in the cross sections.

An optical waveguide device 1 according to this exemplary embodiment is a device in which an optical waveguide structure 100 is formed on an SOI (Silicon on Insulator) substrate 200.

For the SOI substrate 200, only the main part located on the front-surface side is shown in FIG. 1A. In the figure, a symbol 201 indicates a device layer composed of a single-crystal silicon film that forms the uppermost layer of the SOI substrate 200, and a symbol 202 indicates a BOX layer composed of a thermal oxidation film (silicon oxide film) that is the lower layer of the device layer.

The optical waveguide structure 100 includes a base waveguide 110 including a taper section 111 whose width becomes continuously narrower from one side toward the other side, and a narrow-width section 112 that is consecutively connected to the narrow-width side of the taper section 111 and extends toward the other side. In this exemplary embodiment, the narrow-width section 112 has a uniform width as a whole and extends in the waveguide direction.

In this exemplary embodiment, the base waveguide 110 is formed by patterning the surface layer part of the device layer 201, which forms the uppermost layer of the SOI substrate 200, while leaving the device layer 201 on the entire surface.

In FIG. 1A, "one side" is the front-left side of the figure and "other side" is the back-right side of the figure. In FIG. 1B, "one side" is the left side of the figure and "other side" is the right side of the figure.

In the optical waveguide structure 100, three-layered upper waveguides 121 to 123 each of which has a planar shape smaller than the taper section 111 and is composed of a planar-view-roughly-wedge-shaped section whose width becomes continuously narrower from the one side toward the other side are stacked above the taper section 111 of the above-described base waveguide 110 in such a manner that the planar shape becomes successively smaller from the base waveguide 110 side.

Although the upper waveguides each of which is composed of a planar-view-roughly-wedge-shaped section have three layers in this exemplary embodiment, it is also possible to provide upper waveguides having four or more layers.

The "roughly-wedge-shape" includes a perfect wedge shape having a pointed tip and a shape similar to that shape such as a wedge shape having a rounded tip. It also includes variations of the shape due to the manufacturing process accuracy.

In this exemplary embodiment, the three-layered upper waveguides 121 to 123 composed of planar-view-roughly-wedge-shaped sections are formed by patterning a silicon film formed on the SOI substrate 200.

There is no restriction on the crystallinity of the silicon film. That is, the silicon film may be any of single crystal, polycrystal, microcrystal, and amorphous.

In this exemplary embodiment, the end face 111A on the wide-width side of the taper section 111 of the base waveguide 110 is flush with the end faces 121A to 123A on the wide-width side of the three-layered upper waveguides 121 to 123. These end faces 111A and 121A to 123A are formed in such an area size that light propagating through an optical fiber or thorough space can enter therefrom. These end faces can serve as the light entering side or the light emitting side.

Similarly, the end face 112B on the other side of the narrow-width section 112 of the base waveguide 110 is formed in such an area size that light propagating through an optical fiber or thorough space can enter therefrom. This end face can also serve as the light entering side or the light emitting side.

As shown in FIG. 1B, in this exemplary embodiment, each of the base waveguide 110 and the three-layered upper waveguides 121 to 123 is formed in a left-right symmetric shape as viewed from the top as the waveguide direction is defined as the center axis. In this exemplary embodiment, for the base waveguide 110 and the three-layered upper waveguides 121 to 123, the direction perpendicular to the end faces 111A and 121A to 123A on the wide-width side is the axis of symmetry.

However, the base waveguide 110 and the three-layered upper waveguides 121 to 123 may have an asymmetric structure as viewed from the top, and the waveguide direction may be a direction oblique to the end faces 111A and 121A to 123A on the wide-width side.

In FIG. 1B, the following symbols are assigned to the maximum widths (widths of end faces on wide-width side) and the waveguide lengths of the taper section 111 of the base waveguide 110 and the three-layered upper waveguides 121 to 123 respectively: Taper section 111 of base waveguide 110: Maximum width W0, Waveguide length L0; Lowermost upper waveguide 121: Maximum width W1, Waveguide length L1; Intermediate upper waveguide 122: Maximum width W2, Waveguide length L2; and Uppermost upper waveguide 123: Maximum width W3, Waveguide length L3.

In this exemplary embodiment, the relations "W0≥W1≥W2≥W3" and "L0>L1>L2>L3" are satisfied.

The relation of the planar shape size between the taper section 111 of the base waveguide 110 and the three-layered upper waveguides 121 to 123 is not limited to the above-described relations. That is, the only requirement is that the planar shape of the three-layered upper waveguides 121 to 123 should become successively smaller from the base waveguide 110 side.

For example, among the taper section 111 of the base waveguide 110 and the three-layered upper waveguides 121 to 123, the maximum widths or the waveguide lengths of neighboring layers may be adjusted to the same value.

However, in consideration of the fact that the mode conversion proceeds smoothly with a lower loss when compared under the condition of the same waveguide length L0, the upper waveguides 121 to 123 are preferably stacked so that the waveguide length becomes successively shorter from the base waveguide 110 side. That is, the relation "L0>L1>L2>L3" should preferably be satisfied.

In the illustrated example, the relations "W0>W1>W2>W3" and "L0>L1>L2>L3" are satisfied.

In this exemplary embodiment, when light enters from the end face 123A on the wide-width side of the uppermost upper waveguide 123 among the three-layered upper waveguides 121 to 123, the light propagating through the upper waveguide 123 proceeds while its beam shape becomes narrower in the horizontal direction because of the wedge shape of the upper waveguide 123 and moves to the upper waveguide 122 located immediately below. When the light moves to the upper waveguide 122 immediately below, the light is compressed in the vertical direction because of the tip shape of the wedge shape of the upper waveguide 123.

Similarly, the light propagating through the intermediate upper waveguide 122 among the three-layered upper waveguides 121 to 123 proceeds while its beam shape becomes narrower in the horizontal direction because of the wedge shape of the upper waveguide 122 and moves to the upper waveguide 121 located immediately below. When the light moves to the upper waveguide 121 immediately below, the light is compressed in the vertical direction because of the tip shape of the wedge shape of the upper waveguide 122.

Similarly, the light propagating through the lowermost upper waveguide 121 among the three-layered upper waveguides 121 to 123 proceeds while its beam shape becomes narrower in the horizontal direction because of the wedge shape of the upper waveguide 121 and moves to the taper section 111 of the taper section 111 located immediately below. When the light moves to the taper section 111 of the base waveguide 110 immediately below, the light is compressed in the vertical direction because of the tip shape of the wedge shape of the upper waveguide 121.

After that, the light, which has entered the taper section 111 of the taper section 111, proceeds to the narrow-width section 112 with substantially no loss.

As described above, in this exemplary embodiment, when attention is paid to any given one waveguide layer other than the uppermost upper waveguide 123 among the taper section 111 of the base waveguide 110 and the upper waveguides 121 to 123, the light propagates through this waveguide with a smaller spot size than the spot size of the light propagating through the waveguide immediately above this waveguide.

Therefore, in this exemplary embodiment, the beam shape of light that enters from the end face 111A and 121A to 123A on the wide-width side of the optical waveguide structure 100 is made narrower in the horizontal direction through the above-described series of processes. As a result, the light, which has a relatively large spot size when entering the device, is converted into light having a relatively small spot size, and the converted light is emitted from the end face 112B of the narrow width section 112 of the base waveguide 110.

A loss tends to occur when light moves to the lower layer at or near the tips of the upper waveguides 121 to 123.

In the upper waveguides 121 to 123, it is preferable that the distance between the cusps of the tips of mutually vertically neighboring upper waveguides as viewed from the top becomes longer as the position of the neighboring upper waveguides becomes higher. In other words, the distance between the cusps of the tips of the upper waveguides 121 to 123 as viewed from the top is relatively wide in the higher layer, and it is relatively narrow in the lower layer.

Hereinafter, "the distance between the cusps of tips" means "the distance between the cusps of tips as viewed from the top", unless otherwise specified.

Specifically, as shown in a side view shown in FIG. 1C, when the distance between the cusp of tip 121X of the lowermost upper waveguide 121 and the cusp of tip 122X of the intermediate upper waveguide 122 is represented by "C1" and the distance between the cusp of tip 122X of the intermediate upper waveguide 122 and the cusp of tip 123X of the uppermost upper waveguide 123 is represented by "C2", the relation "C2>C1" should preferably be satisfied.

In the above-described configuration, since the distance between the cusps of tips of upper waveguides is relatively wide in the initial stage in the process through which the light moves from the upper layer to the lower layer, it is possible to convert the mode relatively slowly and thereby to reduce the loss. On the lower layer side in which the mode has been already converted to some extent, even if the distance between the cusps of tips of upper waveguides is relatively narrow, it does not cause any large loss.

In consideration of the fact that the mode conversion proceeds smoothly with a lower loss when compared under the condition of the same waveguide length L0, when the upper surface 111S of the taper section 111 of the base waveguide 110 is defined as a reference surface as shown in FIG. 1C, it is preferable that an imaginary line mx connecting all of the cusps of tips 121X to 123X of the upper waveguides 121 to 123 with each other has a convex shape that protrudes above an imaginary straight line m0 connecting the cusp of tip 121X of the lowermost upper waveguide 121 with the cusp of tip 123X of the uppermost upper waveguide 123 as viewed from the side.

As shown in FIG. 1C, in consideration of the fact that the mode conversion proceeds smoothly with a lower loss when compared under the condition of the same waveguide length L0, when the upper surface 111S of the taper section 111 of the base waveguide 110 is defined as a reference surface, as viewed from the side, it is preferable that an imaginary line mx gently connecting all of the cusps of tips 121X to 123X of the upper waveguides 121 to 123 with each other is a convex parabola that protrudes above an imaginary straight line m0 connecting the cusp of tip 121X of the lowermost upper waveguide 121 with the cusp of tip 123X of the uppermost upper waveguide 123.

In this specification, "imaginary line mx gently connecting all of the cusps of tips 121X to 123X of the upper waveguides 121 to 123 with each other" is a curved line that is obtained by using an ordinary graph drawing software program and performing smoothing.

Figure 1D:
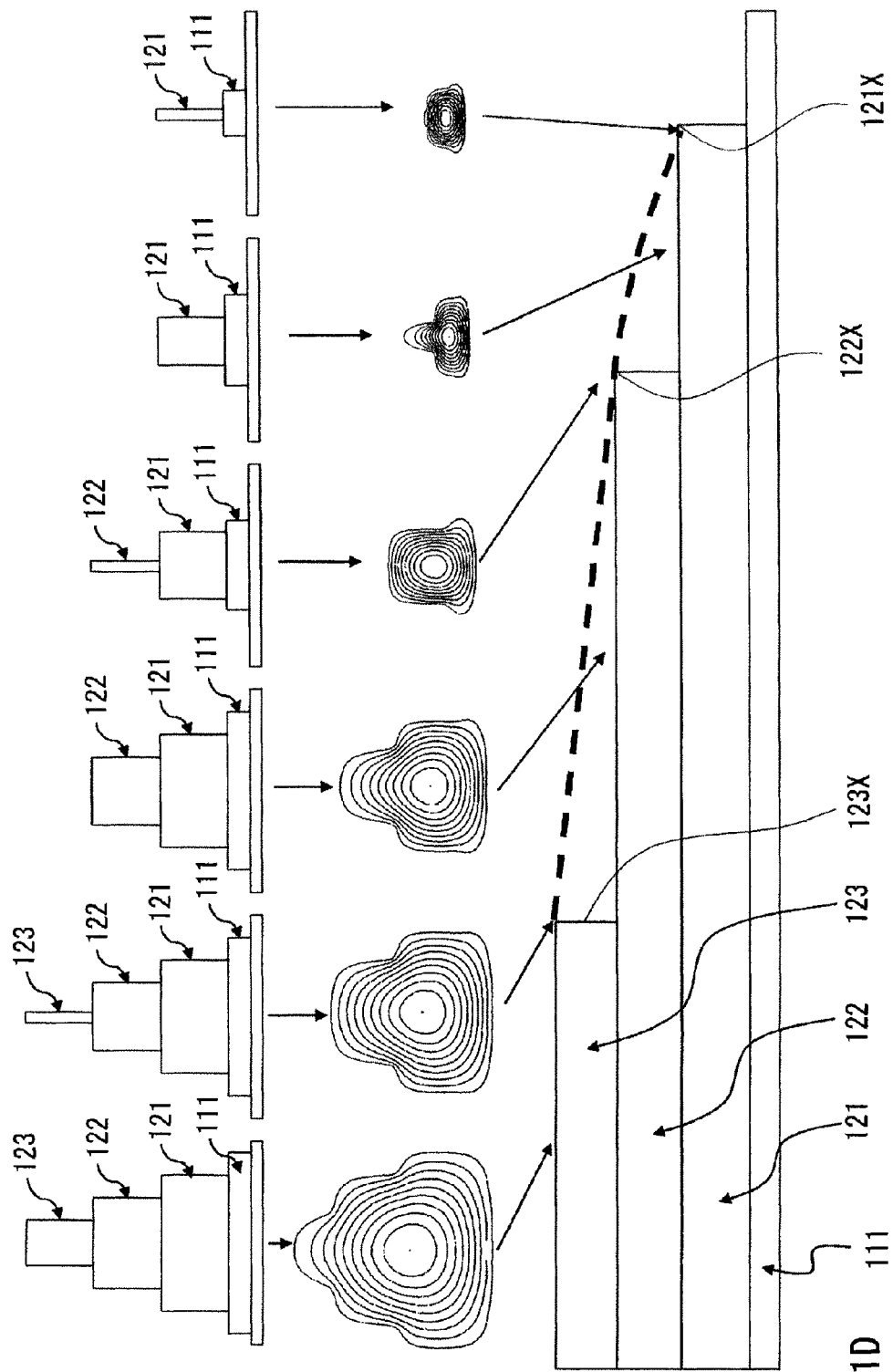
FIG. 1D is a simulation example of a spot size of light.

FIG. 1D shows a simulation example of spot sizes of light near the center in the waveguide direction of the respective upper waveguides 121 to 123 and at the respective cusps of tips 121X to 123X when the upper surface 111S of the taper section 111 of the base waveguide 110 is defined as a reference surface, as viewed from the side, and the imaginary line mx gently connecting all of the cusps of tips 121X to 123X of the upper waveguides 121 to 123 with each other is a convex parabola that protrudes above the imaginary straight line m0 connecting the cusp of tip 121X of the lowermost upper waveguide 121 with the cusp of tip 123X of the uppermost upper waveguide 123.

The figure shown in the lower part of FIG. 1D is a side view of the taper section 111 of the base waveguide 110 and the upper waveguides 121 to 123, and the figure shown in the middle part of FIG. 1D shows simulation results of spot sizes of light in the respective positions of the upper waveguides 121 to 123. The figure shown in the upper part of FIG. 1D schematically shows the amounts of lights that propagate through the respective layers as viewed from the tip side of the upper waveguides 121 to 123 in the respective simulations, in which the shapes of the respective layers schematically show effective area sizes used in the calculation.

In FIG. 1D, it is shown that light moves downward at the cusps of tips 121X to 123X of the upper waveguides 121 to 123 and the spot size becomes smaller.

In the cusps of tips 121X to 123X of the upper waveguides 121 to 123, the smaller the spot size is, the higher density the light moves to the lower layer with. Therefore, in the upper waveguides 121 to 123, the distance between the cusps of tips of mutually vertically neighboring upper waveguides as viewed from the top is relatively wide in the higher layer, and it is relatively narrow in the lower layer.

Specifically, as described above, when the upper surface 111S of the taper section 111 of the base waveguide 110 is defined as a reference surface, as viewed from the side, it is more preferable that the imaginary line mx connecting all of the cusps of tips 121X to 123X of the upper waveguides 121 to 123 with each other has a convex shape that protrudes above the imaginary line m0 connecting the cusp of tip 121X of the lowermost upper waveguide 121 with the cusp of tip 123X of the uppermost upper waveguide 123. More preferably, the imaginary line mx is a convex parabola that protrudes above the imaginary line m0.

As described above, although it is particularly preferable that the imaginary line mx has a convex shape that protrudes above the imaginary line m0, the imaginary line mx may be a straight line conforming to the imaginary line m0 or may have a convex shape that protrudes below the imaginary line m0.

In this exemplary embodiment, it is possible, regardless of the shape of the imaginary line mx, to realize a mode conversion with a lower loss compared to the optical waveguide structures disclosed in Patent literatures 1 to 5, each of which is a two-layer or three-layer structure including a base waveguide and one upper waveguide layer, when compared under the condition of the same waveguide length L0, by providing at least three-layered upper waveguides.

A case where light enters from the end faces 121A to 123A on the wide-width side of the three-layered upper waveguides 121 to 123 has been explained above.

Light can enter from the end face 112B on the other side of the narrow-width section 112 of the base waveguide 110. In this case, the spot size of the light increases in a stepwise manner through the inverse process to the above-described process, and light having a relatively large spot size in comparison to the spot size at the time when the light has entered is emitted from the end faces 121A to 123A on the wide-width side of the three-layered upper waveguides 121 to 123.

The optical waveguide device 1 according to this exemplary embodiment can be preferably used as a mode converter or the like.

If necessary, the optical waveguide device 1 according to this exemplary embodiment may be equipped with other components necessary as a mode converter or the like, such as a clad layer (illustration is omitted).

According to this exemplary embodiment, it is possible to provide a small optical waveguide structure 100 capable of converting the spot size of light, and capable of reducing the conversion loss when compared under the condition of the same waveguide length L0 and performing an optical conversion with high efficiency, and an optical waveguide device 1.

The fact that a highly-efficient optical conversion can be realized by using a smaller device according to this exemplary embodiment is shown by using data in the below-described [Examples] section.

In this exemplary embodiment, there is no particular restriction on the waveguide length L0 of the taper section 111 of the base waveguide 110, and a low loss can be achieved with the waveguide length L0 of 2 mm or shorter.

[Design Change]

In the above-described exemplary embodiment, an aspect in which three-layered upper waveguides 121 to 123 each of which is composed of a planar-view-roughly-wedge-shaped section are provided is explained.

An advantageous effect of the present invention can be achieved when the upper waveguide includes a planar-view-roughly-wedge-shaped section at least on the tip side. Therefore, each upper waveguide may have a shape that is obtained by combining a rough wedge shape with another shape(s) as viewed from the top. For example, each upper waveguide may have such a shape that a wide-width section having a uniform width is disposed on the wide-width side of a planar-view-roughly-wedge-shaped section.

The upper waveguides including planar-view-roughly-wedge-shaped sections may have three or more layers. The larger the number of upper waveguides including planar-view-roughly-wedge-shaped sections is, the more the loss can be reduced under the condition of the same waveguide length L0. Therefore, it is preferable (see the below-described Examples 3-1 to 3-3).

Even when the upper waveguides including planar-view-roughly-wedge-shaped sections have three or more layers, a plurality of upper waveguides may be stacked by using similar design to that of the above-described exemplary embodiment.

Specific examples are shown below.

It is preferable that the end face of the base waveguide is flush with the end faces on the wide-width side of the three-layered upper waveguides.

The three-layered upper waveguides are preferably stacked in such a manner that the waveguide length becomes successively shorter from the base waveguide side.

When the upper surface of the base waveguide is defined as a reference surface, as viewed from the side, it is preferable that an imaginary line mx connecting all of the cusps of tips of the at least three-layered upper waveguides with each other has a convex shape that protrudes above an imaginary straight line m0 connecting the cusp of tip of the lowermost upper waveguide among the at least three-layered upper waveguides with the cusp of tip of the uppermost upper waveguide.

When the upper surface of the base waveguide is defined as a reference surface, as viewed from the side, it is more preferable that an imaginary line mx gently connecting all of the cusps of tips of the three-layered upper waveguides with each other is a convex parabola that protrudes above an imaginary straight line m0 connecting the cusp of tip of the lowermost upper waveguide with the cusp of tip of the uppermost upper waveguide.

Even in the three-layered upper waveguides, when attention is paid to any given one waveguide layer other than the uppermost upper waveguide among the taper section of the base waveguide and the three-layered upper waveguides, the light propagates through this waveguide with a smaller spot size than the spot size of the light beam propagating through the waveguide immediately above this waveguide.

EXAMPLES

Examples according to the present invention and Comparative examples are explained.

Example 1

Calculation of an optical loss was carried out for an optical waveguide device including a base waveguide 110 and three-layered wedge-shaped upper waveguides 121 to 123 stacked above the base waveguide 110 like the one shown in FIGS. 1A to 1C. In this optical waveguide device, the relations "W0>W1>W2>W3" and "L0>L1>L2>L3" are satisfied.
(Note that,
Taper section 111 of base waveguide 110: Maximum width W0, Waveguide length L0;
Upper waveguide 121: Maximum width W1, Waveguide length L1;
Upper waveguide 122: Maximum width W2, Waveguide length L2; and
Upper waveguide 123: Maximum width W3, Waveguide length L3.)

Figure 2A:
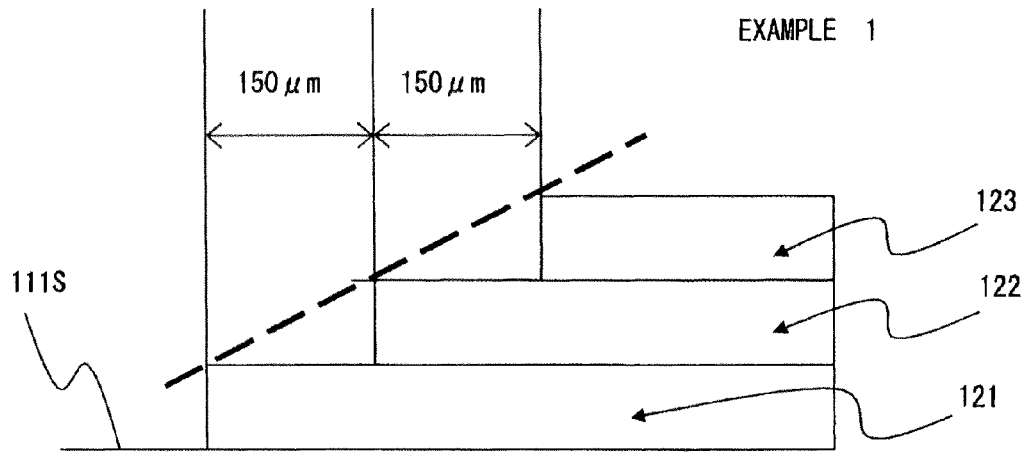
FIG. 2A is a cross section of the main part showing design of Example 1.

As shown in FIG. 2A, the device is configured in such a manner that when the upper surface 111S of the taper section 111 of the base waveguide 110 is defined as a reference surface, as viewed from the side, the cusps of tips 121X to 123X of the upper waveguides 121 to 123 are connected with each other on a straight line.

The distance C1 between the cusp of tip 121X of the lowermost upper waveguide 121 and the cusp of tip 122X of the intermediate upper waveguide 122 was adjusted as "C1=150 µm", and the distance C2 between the cusp of tip 122X of the intermediate upper waveguide 122 and the cusp of tip 123X of the uppermost upper waveguide 123 was adjusted as "C2=150 µm".

Figure 2B:
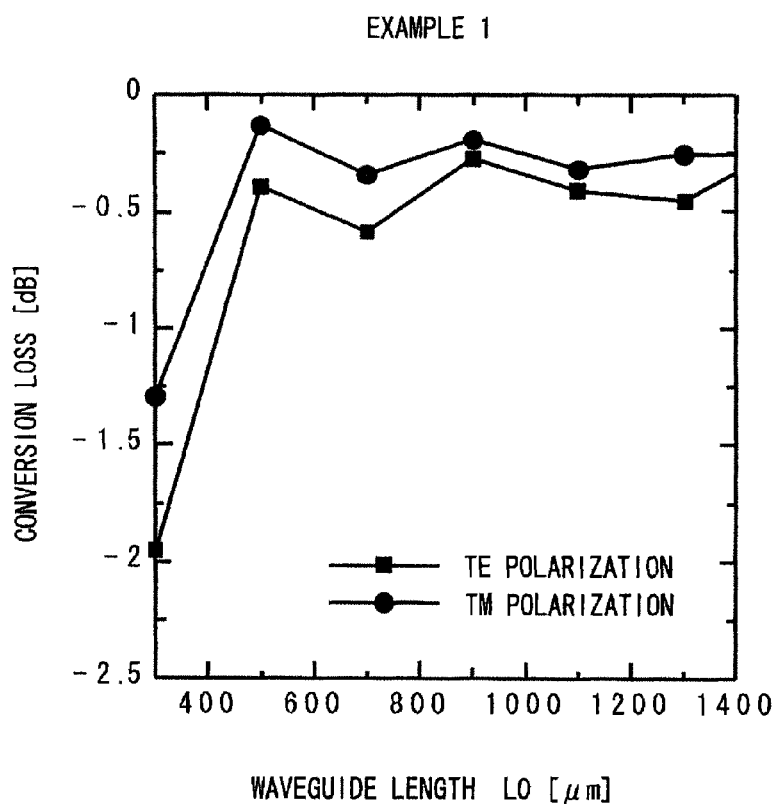
FIG. 2B is a graph showing a result of Example 1.

Optical conversion losses in the taper section 111 of the base waveguide 110 and the upper waveguides 121 to 123 were calculated by a beam propagation method while changing the waveguide length L0 of the taper section 111 of the base waveguide 110. FIG. 2B shows the results.

Comparative Example 1

Figure 3A:
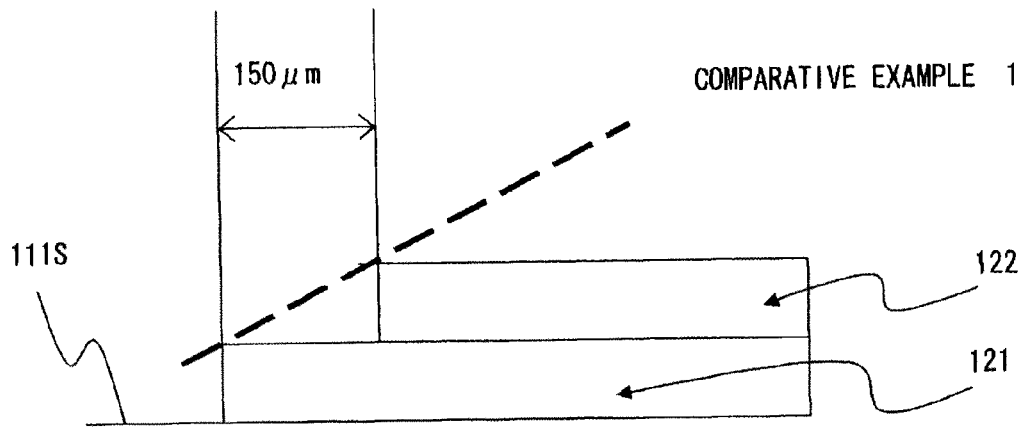
FIG. 3A is a cross section of the main part showing design of Comparative example 1.

Calculation was carried out in a similar manner to that of Example 1 except that two-layered wedge-shaped upper waveguides 121 and 122 were formed above the base waveguide 110 as shown in FIG. 3A. This device is in conformity to the design disclosed in FIG. 3 of Patent literature 5 mentioned in the "Background art" section.

Comparison Between Example 1 and Comparative Example 1

Figure 3B:
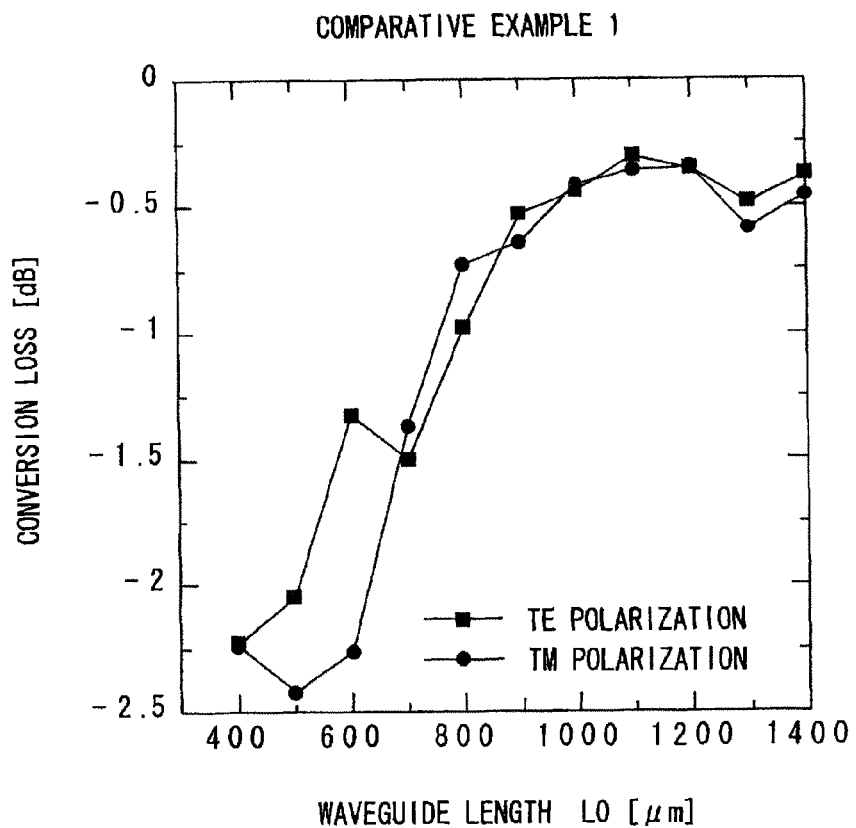
FIG. 3B is a graph showing a result of Comparative example 1.

As obvious from the comparison between FIG. 2B and FIG. 3B, a low loss is achieved with a shorter waveguide length L0 in Example 1, in which the wedge-shaped upper waveguides formed above the base waveguide have three layers, in comparison to the device shown as Comparative example 1, in which the wedge-shaped upper waveguides have two layers.

For example, for a low loss of −0.5 dB, Comparative example 1 requires a waveguide length L0 of about 950 µm. In contrast to this, Example 1 can achieve it with a waveguide length L0 of about 500 µm.

Examples 2-1 to 2-3

In Examples 2-1 to 2-3, calculation was carried out in a similar manner to that of Example 1 except that the positions of the cusps of tips 121X to 123X of the upper waveguides 121 to 123 were changed.

Example 2-1

Figure 4A:
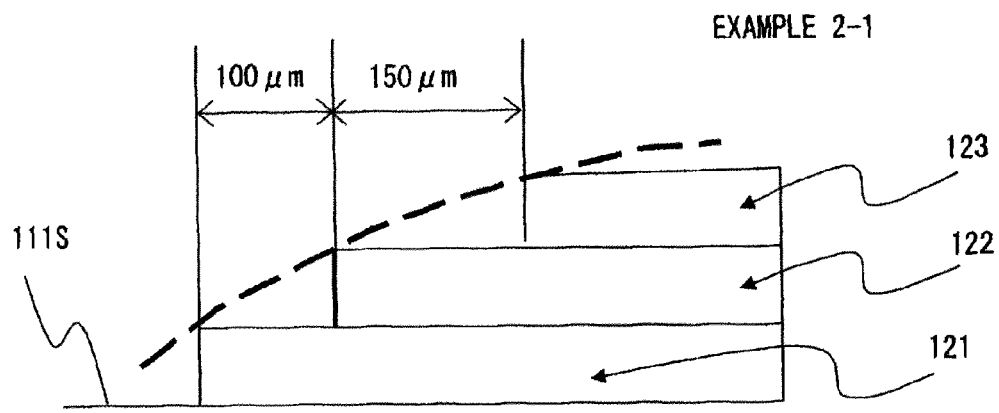
FIG. 4A is a cross section of the main part showing design of Example 2-1.

As shown in FIG. 4A, the device is configured in such a manner that when the upper surface 111S of the taper section 111 of the base waveguide 110 is defined as a reference surface, as viewed from the side, an imaginary line mx gently connecting all of the cusps of tips 121X to 123X of the upper waveguides 121 to 123 with each other is a convex parabola that protrudes above an imaginary straight line m0 connecting the cusp of tip 121X of the lowermost upper waveguide 121 with the cusp of tip 123X of the uppermost upper waveguide 123.

The distance C1 between the cusp of tip 121X of the lowermost upper waveguide 121 and the cusp of tip 122X of the intermediate upper waveguide 122 was adjusted as "C1=100 µm", and the distance C2 between the cusp of tip 122X of the intermediate upper waveguide 122 and the cusp of tip 123X of the uppermost upper waveguide 123 was adjusted as "C2=150 µm".

Example 2-2

Figure 5A:
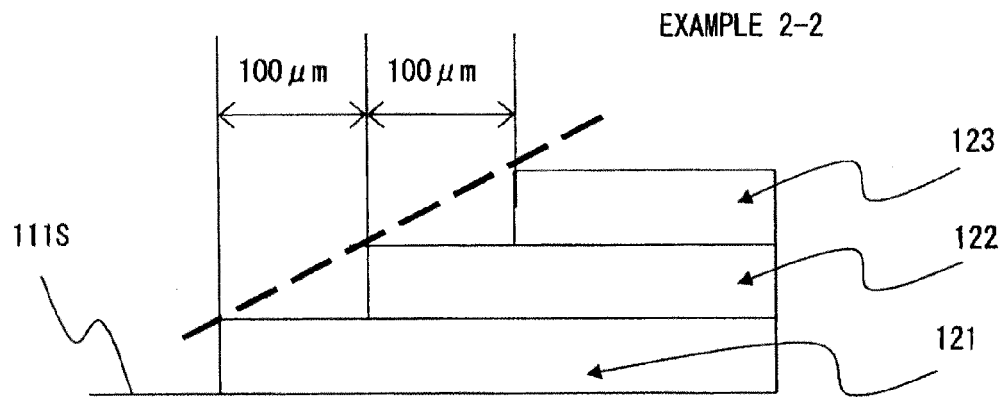
FIG. 5A is a cross section of the main part showing design of Example 2-2.

As shown in FIG. 5A, the device is configured in such a manner that when the upper surface 111S of the taper section 111 of the base waveguide 110 is defined as a reference surface, as viewed from the side, the cusps of tips 121X to 123X of the upper waveguides 121 to 123 are connected with each other on a straight line.

The distance C1 between the cusp of tip 121X of the lowermost upper waveguide 121 and the cusp of tip 122X of the intermediate upper waveguide 122 was adjusted as "C1=100 µm", and the distance C2 between the cusp of tip 122X of the intermediate upper waveguide 122 and the cusp of tip 123X of the uppermost upper waveguide 123 was adjusted as "C2=100 µm".

Example 2-3

Figure 6A:
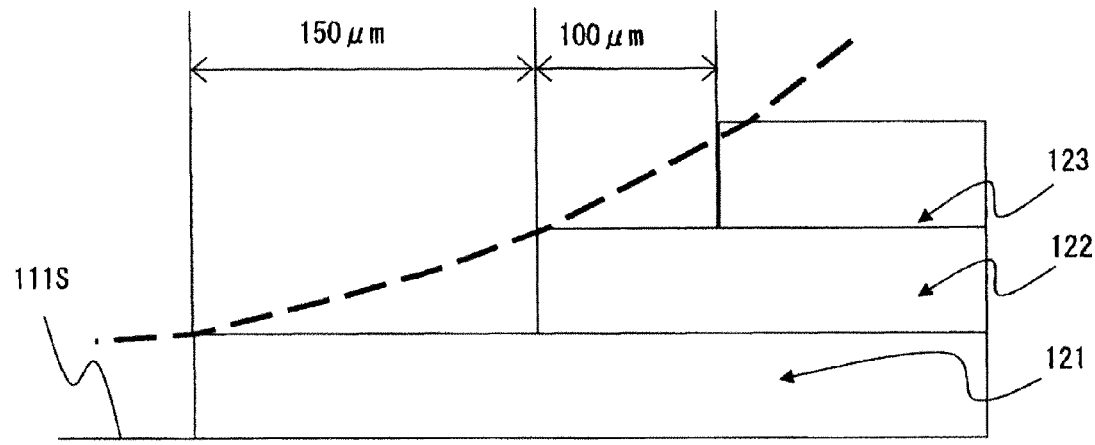
FIG. 6A is a cross section of the main part showing design of Example 2-3.

As shown in FIG. 6A, the device is configured in such a manner that when the upper surface 111S of the taper section 111 of the base waveguide 110 is defined as a reference surface, as viewed from the side, an imaginary line mx gently connecting all of the cusps of tips 121X to 123X of the upper waveguides 121 to 123 with each other is a convex parabola that protrudes below an imaginary straight line m0 connecting the cusp of tip 121X of the lowermost upper waveguide 121 with the cusp of tip 123X of the uppermost upper waveguide 123.

The distance C1 between the cusp of tip 121X of the lowermost upper waveguide 121 and the cusp of tip 122X of the intermediate upper waveguide 122 was adjusted as "C1=150 µm", and the distance C2 between the cusp of tip 122X of the intermediate upper waveguide 122 and the cusp of tip 123X of the uppermost upper waveguide 123 was adjusted as "C2=100 µm".

Results of Examples 2-1 to 2-3

Figure 4B:
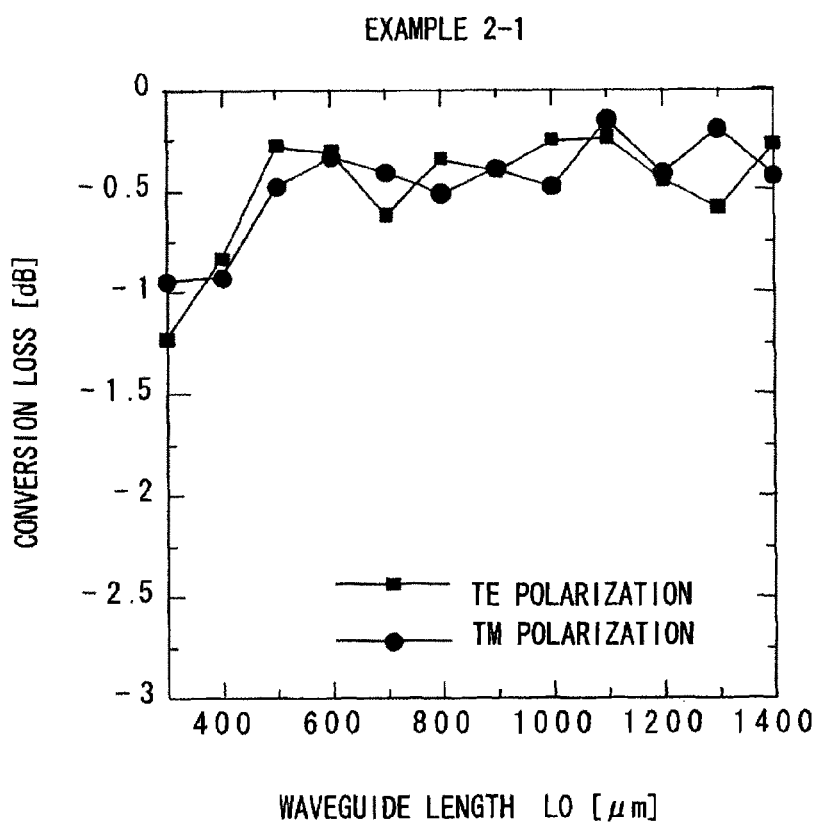
FIG. 4B is a graph showing a result of Example 2-1.
Figure 5B:
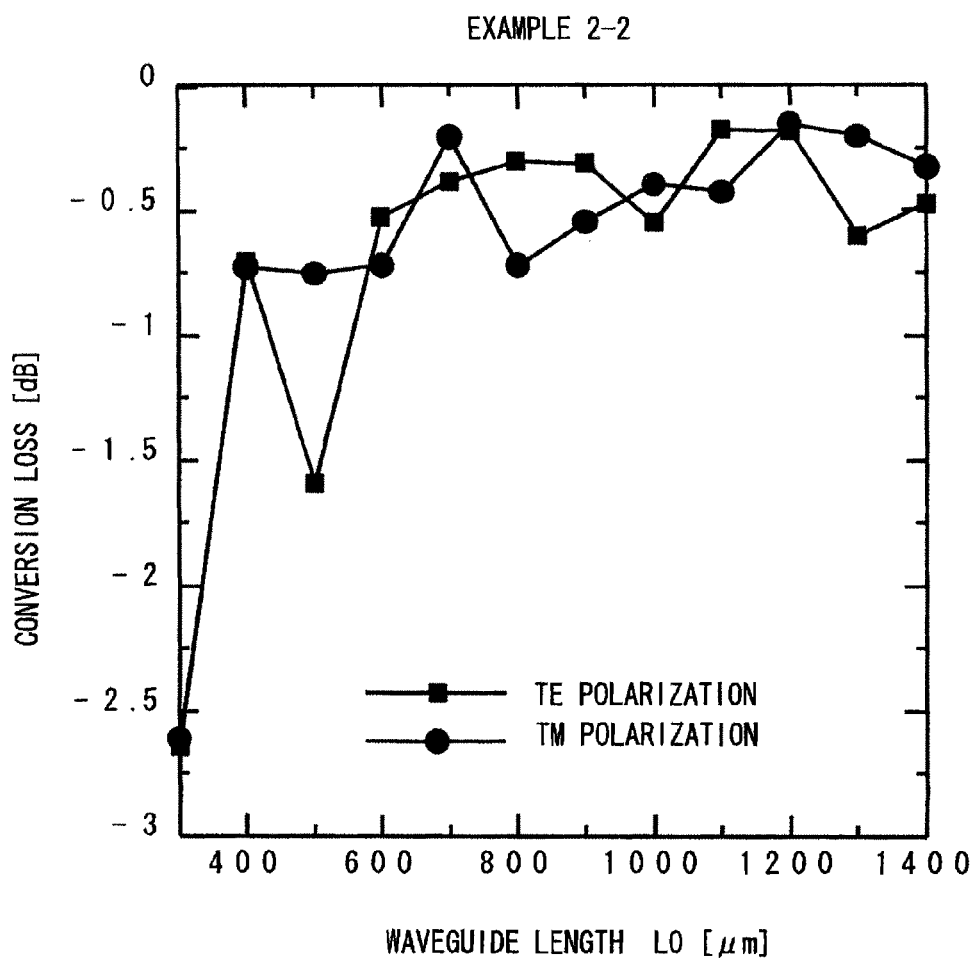
FIG. 5B is a graph showing a result of Example 2-2.
Figure 6B:
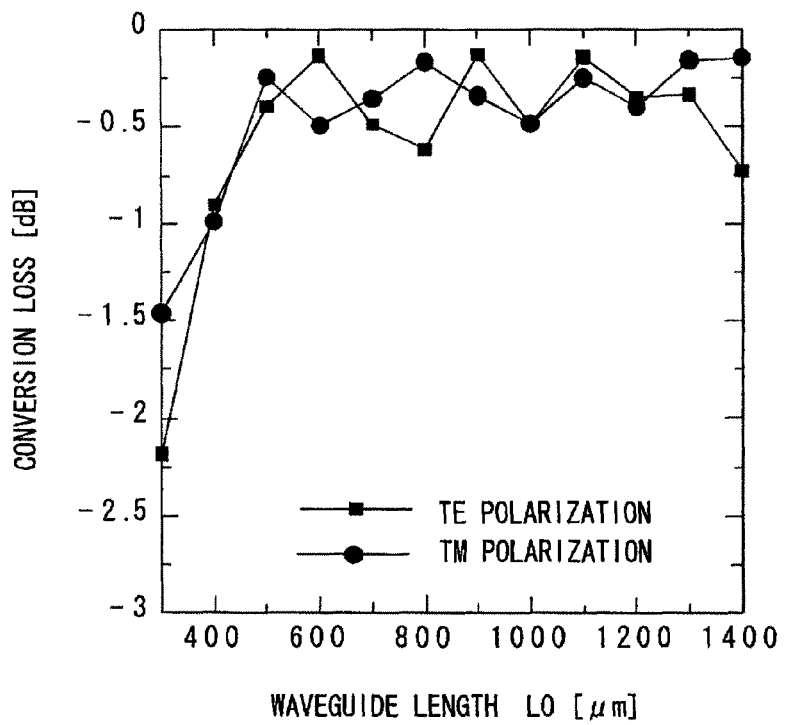
FIG. 6B is a graph showing a result of Example 2-3.

FIGS. 4B, 5B and 6B show calculation results of Examples 2-1, 2-2 and 2-3 respectively. In these graphs, it is shown that the lowest loss can be achieved in Example 2-1, in which the imaginary line mx gently connecting the cusps of tips 121X to 123X of the upper waveguides 121 to 123 has a convex shape that protrudes above the imaginary line m0, when compared under the condition of the same waveguide length L0.

Examples 3-1 to 3-3

In Examples 3-1 to 3-3, calculation was carried out in a similar manner to that of Examples 2-1 to 2-3 except that the wedge-shaped upper waveguides had ten layers. Regarding the shape of the imaginary line mx, Example 3-1 corresponds to Example 2-1 (the imaginary line mx is a convex parabola that protrudes above the imaginary line m0); Example 3-2 corresponds to Example 2-2 (the imaginary line mx conforms to the imaginary line m0); and Example 3-3 corresponds to Example 2-3 (the imaginary line mx is a convex parabola that protrudes below the imaginary line m0).

Figure 7:
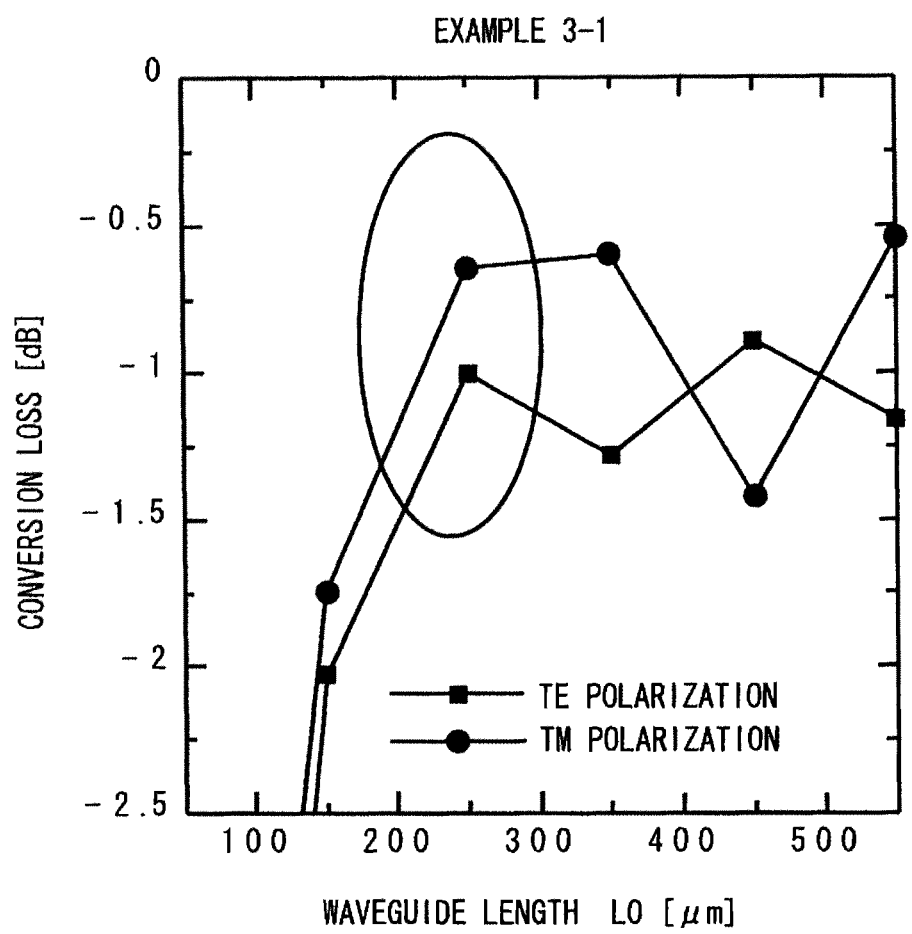
FIG. 7 is a graph showing a result of Example 3-1.
Figure 8:
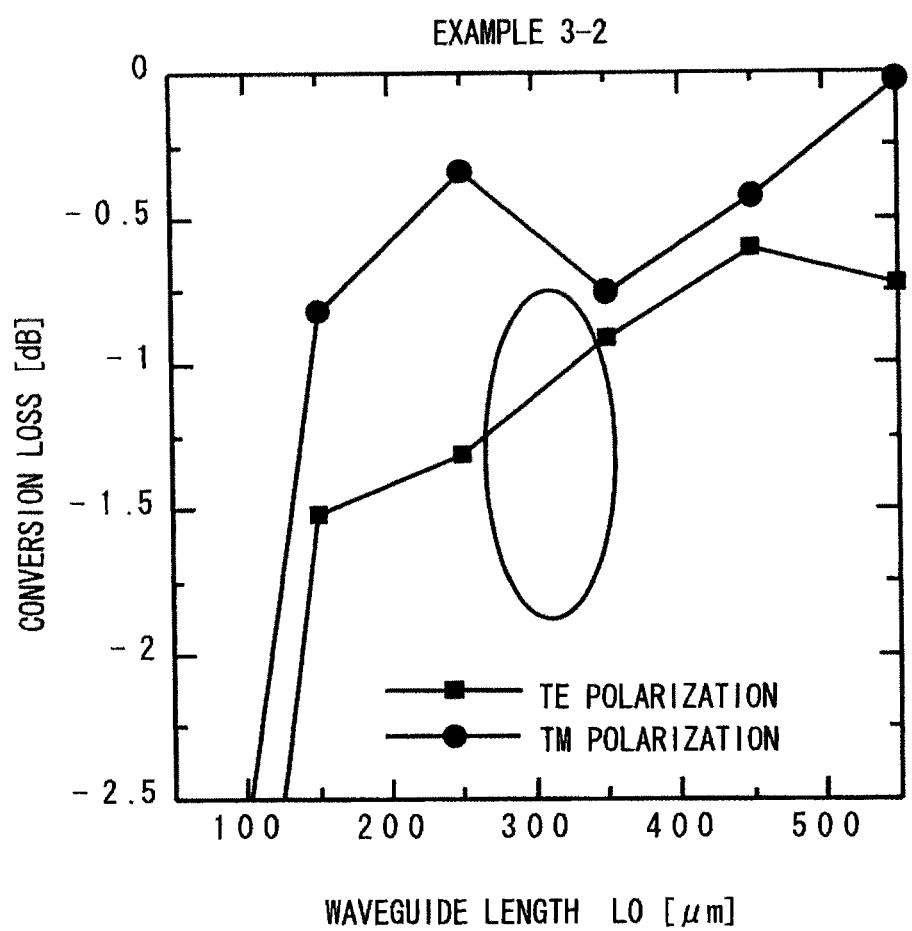
FIG. 8 is a graph showing a result of Example 3-2.
Figure 9:
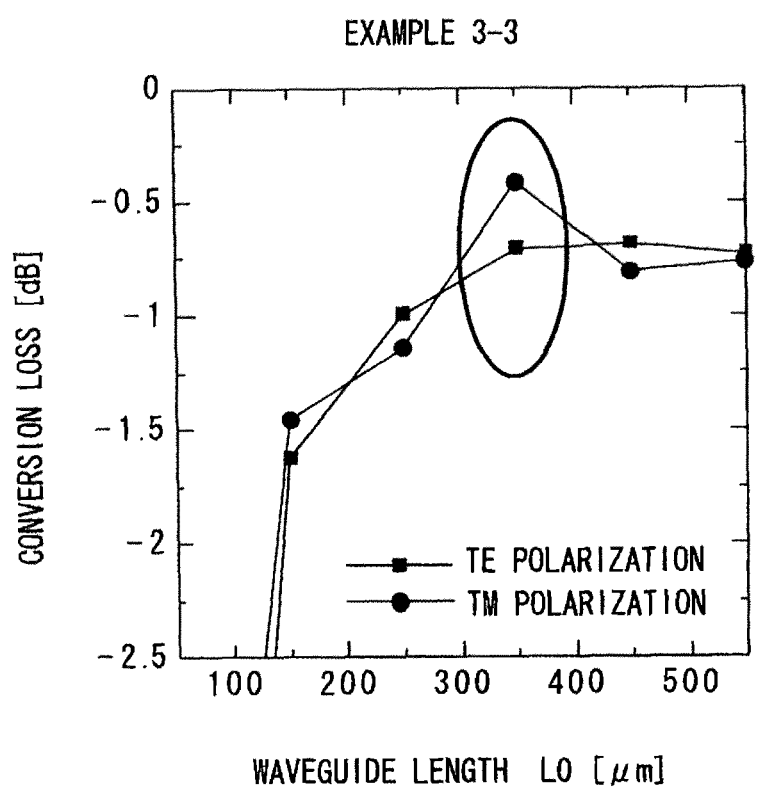
FIG. 9 is a graph showing a result of Example 3-3.

FIGS. 7 to 9 show the respective calculation results. In each figure, an area in which both losses of TM polarization and TE polarization are roughly equal to or less than 1 dB is surrounded by a circle.

In these graphs, it is shown that the lowest loss can be achieved in Example 3-1, in which the imaginary line mx gently connecting the cusps of tips of the upper waveguides has a convex shape that protrudes above the imaginary line m0, when compared under the condition of the same waveguide length L0.

Further, based on the comparison between FIG. 4B and FIG. 7 and the like, it is shown that the larger the number of wedge-shaped upper waveguides is, the more the loss can be reduced under the condition of the same waveguide length L0. The larger the number of wedge-shaped upper waveguides is, the more smoothly the light proceeds between mutually vertically neighboring wedge-shaped upper waveguides. Therefore, a device causing a lower loss can be obtained.

Example 4

In Example 4, calculation was carried out in a similar manner to that of Example 1 except that the refractivity of the upper waveguides 121 to 123 was changed and the height of the upper waveguides 121 to 123 was optimized according to the changed refractivity. In this case, the optimum values for the heights of the upper waveguides were values shown below.

Upper waveguide 121: 1 μm, Upper waveguide 122: 3 μm, and Upper waveguide 123: 3.5 μm.

Figure 10:
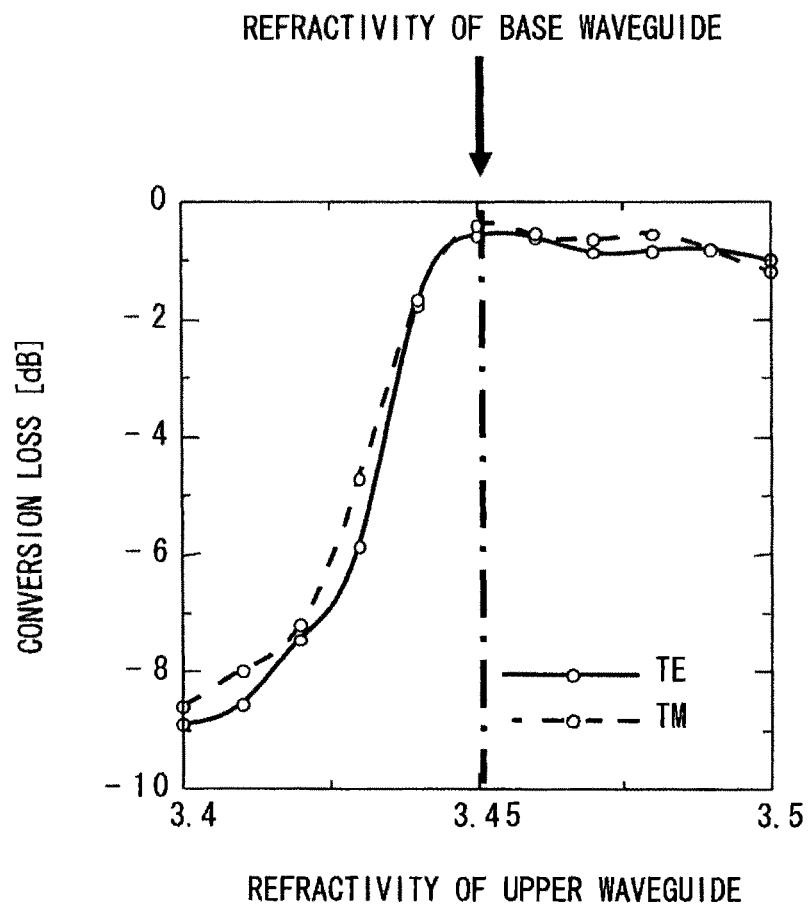
FIG. 10 is a graph showing a result of Example 4.

FIG. 10 shows conversion losses that were obtained when the refractivity of the upper waveguides 121 to 123 (horizontal axis) was changed while the refractivity of the base waveguide 110 was fixed to 3.45. In FIG. 10, it is shown that when the refractivity of the upper waveguides 121 to 123 is equal to or greater than the refractivity of the base waveguide 110, the conversion loss becomes smaller. Based on this fact, it has been found out that the refractivity should preferably be adjusted to a value larger than the refractivity of the base waveguide.

Design Change

Although the present invention is explained above with reference to exemplary embodiments, the present invention is not limited to the description above. Various modifications that can be understood by those skilled in the art can be made to the configuration and details of the present invention within the scope of the invention.

INDUSTRIAL APPLICABILITY

An optical waveguide structure and an optical waveguide device according to the present invention can be preferably applied to a mode converter or the like.

REFERENCE SIGNS LIST

1 OPTICAL WAVEGUIDE DEVICE
100 OPTICAL WAVEGUIDE STRUCTURE
110 BASE WAVEGUIDE
111 TAPER SECTION
111A END FACE ON WIDE-WIDTH SIDE OF TAPER SECTION
111S UPPER SURFACE OF TAPER SECTION
112 NARROW-WIDTH SECTION
112B END FACE OF NARROW-WIDTH SECTION
121 TO 123 UPPER WAVEGUIDE
121A TO 123A END FACE ON WIDE-WIDTH SIDE OF UPPER WAVEGUIDE
121X TO 123X CUSP OF TIP OF UPPER WAVEGUIDE.
200 SOI SUBSTRATE
201 DEVICE LAYER
202 BOX LAYER
C1 DISTANCE BETWEEN CUSPS OF TIPS
C2 DISTANCE BETWEEN CUSPS OF TIPS
L0 TO L3 WAVEGUIDE LENGTH
W0 TO W3 MAXIMUM WIDTH
mx, m0 IMAGINARY LINE

The invention claimed is:

1. An optical waveguide structure comprising a base waveguide comprising a taper section whose width becomes continuously narrower from one side toward another side, and a narrow-width section that is consecutively connected to a narrow-width side of the taper section and extends toward the another side, wherein
at least three-layered upper waveguides each of which has a planar shape smaller than the taper section and includes a planar-view-roughly-wedge-shaped section whose width becomes continuously narrower from the one side toward the another side at least on a tip side are stacked above the taper section of the base waveguide in such a manner that the planar shape becomes successively smaller from the base waveguide side, and
a maximum width of an uppermost layer among the at least three-layered upper waveguides is narrower than a maximum width of the base waveguide,
wherein when an upper surface of the base waveguide is defined as a reference surface, as viewed from a side,
an imaginary line connecting all of cusps of tips of the at least three-layered upper waveguides with each other has a convex shape that protrudes above an imaginary straight line connecting a cusp of tip of a lowermost upper waveguide among the at least three-layered upper waveguides with a cusp of tip of an uppermost upper waveguide.

2. The optical waveguide structure according to claim 1, wherein an end face of the base waveguide is flush with an end face on a wide-width side of the at least three-layered upper waveguides.

3. The optical waveguide structure according to claim 2, wherein the at least three-layered upper waveguides are stacked so that a waveguide length becomes successively shorter from the base waveguide side.

4. The optical waveguide structure according to claim 1, wherein when an upper surface of the base waveguide is defined as a reference surface, as viewed from a side,
the imaginary line gently connecting all of the cusps of tips of the at least three-layered upper waveguides with each other is a convex parabola that protrudes above the imaginary straight line connecting the cusp of tip of the lowermost upper waveguide with the cusp of tip of the uppermost upper waveguide.

5. The optical waveguide structure according to claim 1, wherein a waveguide length of the taper section of the base waveguide is equal to or less than 2 mm.

6. The optical waveguide structure according to claim 1, wherein in the at least three-layered upper waveguides, when attention is paid to any given one upper waveguide layer other than an uppermost upper waveguide, light propagates through this upper waveguide with a smaller spot size than a spot size of light propagating through an upper waveguide immediately above this upper waveguide.

7. The optical waveguide structure according to claim 1, wherein a value of a refractivity of the upper waveguides is equal to or greater than a value of a refractivity of the base waveguide.

8. An optical waveguide device comprising an optical waveguide structure according to claim 1.

9. The optical waveguide structure according to claim 1, wherein the at least three-layered upper waveguides are stacked in such a manner that a maximum width becomes successively narrower from the base waveguide side.

* * * * *